(12) United States Patent
Aoki et al.

(10) Patent No.: US 8,130,868 B2
(45) Date of Patent: Mar. 6, 2012

(54) RADIO COMMUNICATION APPARATUS, RADIO COMMUNICATION METHOD AND PROGRAM STORAGE MEDIUM

(75) Inventors: Tsuguhide Aoki, Kawasaki (JP); Hiroki Mori, Kawasaki (JP); Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 702 days.

(21) Appl. No.: 12/338,858

(22) Filed: Dec. 18, 2008

(65) Prior Publication Data

US 2009/0168915 A1 Jul. 2, 2009

(30) Foreign Application Priority Data

Dec. 26, 2007 (JP) ................................. 2007-334889

(51) Int. Cl.
*H04L 27/04* (2006.01)
(52) U.S. Cl. ....................................................... 375/299
(58) Field of Classification Search .................. 375/260, 375/267, 296, 299
See application file for complete search history.

(56) References Cited

U.S. PATENT DOCUMENTS

| | | | | |
|---|---|---|---|---|
| 7,139,328 B2 * | 11/2006 | Thomas et al. | ............... | 375/299 |
| 7,286,609 B2 * | 10/2007 | Maltsev et al. | ............... | 375/267 |
| 7,616,704 B2 * | 11/2009 | Li et al. | .......................... | 375/299 |
| 2007/0135052 A1 * | 6/2007 | Park et al. | ..................... | 455/63.1 |
| 2007/0263736 A1 * | 11/2007 | Yuda et al. | ..................... | 375/260 |

OTHER PUBLICATIONS

Caire, On the Achievable Throughput of a Multiantenna Gaussian Broadcast Channel, IEEE Transactions of Information Theory, vol. 49, No. 7, Jul. 2003.

* cited by examiner

*Primary Examiner* — Kevin Kim
(74) *Attorney, Agent, or Firm* — Turocy & Watson, LLP

(57) ABSTRACT

A radio communication apparatus includes: generation units generating first to mth signals; a storage storing allocation information defining that beams of different quality levels are allocated to first to mth communication apparatuses for each of first to nth subcarriers so that frequencies of respective quality levels are substantially uniform over all the subcarriers among the apparatuses; determining units determining transmission weights by which the signals are multiplied so that the beams according to the allocation information are formed for the apparatuses for each of the subcarriers; generation units performing multiplication processing by using the signals and the weights for each of the subcarriers to generate first to hth weighted signals for each of the subcarriers; transform units performing inverse Fourier transform on the weighted signals for each of the subcarriers to generate first to hth transformed signals; and transmission processing units transmitting the transformed signals via first to hth antennas.

8 Claims, 9 Drawing Sheets

FIG. 2

(A) 1 Channel model B

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| STREAM 1 | 3 | 3 | 3 | 3 | 3 | 3 | 3 | 3 | 3 | 3 | 3 | 3 | 3 | 3 | 3 | 3 |
| STREAM 2 | 4 | 4 | 4 | 4 | 4 | 4 | 4 | 4 | 4 | 4 | 4 | 4 | 4 | 4 | 4 | 4 |
| STREAM 3 | 1 | 1 | 1 | 1 | 1 | 1 | 1 | 1 | 1 | 1 | 1 | 1 | 1 | 1 | 1 | 1 |
| STREAM 4 | 2 | 2 | 2 | 2 | 2 | 2 | 2 | 2 | 2 | 2 | 2 | 2 | 2 | 2 | 2 | 2 |

SUBCARRIER NUMBER (B) 2 Channel model D

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| STREAM 1 | 1 | 1 | 1 | 1 | 1 | 1 | 1 | 1 | 1 | 4 | 4 | 4 | 4 | 4 | 4 | 3 |
| STREAM 2 | 4 | 4 | 4 | 4 | 4 | 4 | 4 | 4 | 4 | 1 | 1 | 1 | 1 | 1 | 1 | 4 |
| STREAM 3 | 2 | 2 | 2 | 2 | 2 | 2 | 2 | 2 | 3 | 3 | 3 | 3 | 3 | 3 | 3 | 1 |
| STREAM 4 | 3 | 3 | 3 | 3 | 3 | 3 | 3 | 3 | 2 | 2 | 2 | 2 | 2 | 2 | 2 | 2 |

SUBCARRIER NUMBER

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| STREAM 1 | 1 | 1 | 1 | 1 | 2 | 2 | 2 | 2 | 4 | 4 | 4 | 4 | 3 | 3 | 3 | 3 |
| STREAM 2 | 2 | 2 | 2 | 2 | 3 | 3 | 3 | 3 | 1 | 1 | 1 | 1 | 4 | 4 | 4 | 4 |
| STREAM 3 | 3 | 3 | 3 | 3 | 4 | 4 | 4 | 4 | 2 | 2 | 2 | 2 | 1 | 1 | 1 | 1 |
| STREAM 4 | 4 | 4 | 4 | 4 | 1 | 1 | 1 | 1 | 3 | 3 | 3 | 3 | 2 | 2 | 2 | 2 |

SUBCARRIER NUMBER

FIG. 6

RADIO COMMUNICATION APPARATUS, RADIO COMMUNICATION METHOD AND PROGRAM STORAGE MEDIUM

CROSS REFERENCE TO RELATED APPLICATIONS

This application is based upon and claims the benefit of priority from the prior Japanese Patent Applications No. 2007-334889, filed on Dec. 26, 2007; the entire contents of which are incorporated herein by reference.

BACKGROUND OF THE INVENTION

1. Field of the Invention

The present invention relates to a radio communication apparatus, radio communication method and program storage medium, and, for example, to a radio transmission technique using a plurality of antennas.

2. Related Art

There is known a spatial division multiple access (SDMA) scheme which is a technique of multiplexing a plurality of users at the same frequency and the same time using a plurality of antennas.

Now, suppose a base station (radio communication apparatus) has two antennas (antennas 1 and 2) and two user terminals (user terminal 1, user terminal 2) each have one antenna.

Suppose transmission signals to the user terminals 1 and 2 are $$s = [s_1, s_2]^T \quad \text{[Formula 1]}$$

and noise signals of the user terminals 1 and 2 are $$n = [n_1, n_2]^T \quad \text{[Formula 2]}$$

received signals of the user terminals 1 and 2 can be described as $$\begin{aligned} y &= Hs + n \\ &= \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \end{aligned} \quad \text{[Formula 3]}$$

Here, "H" is a channel matrix, "$h_{11}$" denotes a channel response from the antenna 1 to the antenna of the user terminal 1, "$h_{12}$" denotes a channel response from the antenna 2 to the antenna of the user terminal 1, "$h_{21}$" denotes a channel response from the antenna 1 to the antenna of the user terminal 2, and "$h_{22}$" denotes a channel response from the antenna 2 to the antenna of the user terminal 2.

Here, when the base station multiplies the transmission signal "s" by a weight:

$$W = H^{-1} \quad \text{[Formula 4]}$$

and transmits the signal, received signals of the user terminals 1 and 2 become $$\begin{aligned} y' &= HWs + n \\ &= s + n \\ &= \begin{bmatrix} s_1 \\ s_2 \end{bmatrix} + \begin{bmatrix} n_1 \\ n_2 \end{bmatrix} \end{aligned} \quad \text{[Formula 5]}$$

That is, the user terminals 1 and 2 can receive only the signals "s1" and "s2" without mutually causing interference. This realizes SDMA and suppose this SDMA is particularly called "ZF (Zero Forcing)-SDMA."

However, since ZF-SDMA uses such weights that cause mutual interference to become 0, the characteristic of each user terminal is the same characteristic as that in the case with reception using one antenna, resulting in a problem that suitable performance cannot be obtained.

SUMMARY OF THE INVENTION

According to an aspect of the present invention, there is provided with a radio communication apparatus that communicates with first to mth (m is an integer of 2 or more) communication apparatuses by using first to hth (h is an integer of m or more) transmission antennas, comprising:

first to mth signal generation units configured to generate first to mth signals to be transmitted to the first to mth communication apparatuses;

an allocation information storage configured to store allocation information defining that beams of different quality levels are allocated to the first to mth communication apparatuses for each of first to nth (n is an integer of 2 or more) subcarriers so that frequencies of respective quality levels are substantially uniform over all the first to nth subcarriers among the first to mth communication apparatuses;

first to nth weight determining units configured to determine transmission weights by which the first to mth signals are multiplied so that the beams of respective quality levels indicated in the allocation information are formed for the first to mth communication apparatuses for each of the first to nth subcarriers;

first to nth weighted signal generation units configured to perform multiplication processing by using the first to mth signals and the transmission weights determined for each of the first to nth subcarriers to generate first to hth weighted signals for each of the first to nth subcarriers;

first to hth inverse Fourier transform units configured to perform inverse Fourier transform on the first to hth weighted signals generated for each of the first to nth subcarriers to generate first to hth inverse Fourier transformed signals; and first to hth transmission processing units configured to transmit the first to hth inverse Fourier transformed signals via the first to hth transmission antennas.

According to an aspect of the present invention, there is provided with a radio communication method that communicates with first to mth (m is an integer of 2 or more) communication apparatuses by using first to hth (h is an integer of m or more) transmission antennas, comprising:

generating first to mth signals to be transmitted to the first to mth communication apparatuses;

reading out allocation information from an allocation information storage, the allocation information defining that beams of different quality levels are allocated to the first to mth communication apparatuses for each of first to nth (n is an integer of 2 or more) subcarriers so that frequencies of respective quality levels are substantially uniform over all the first to nth subcarriers among the first to mth communication apparatuses;

determining transmission weights by which the first to mth signals are multiplied so that the beams of respective quality levels indicated in the allocation information are formed for the first to mth communication apparatuses for each of the first to nth subcarriers;

performing multiplication processing by using the first to mth signals and the transmission weights determined for each of the first to nth subcarriers to generate first to hth weighted signals for each of the first to nth subcarriers;

performing inverse Fourier transform on the first to hth weighted signals generated for each of the first to nth subcarriers to generate first to hth inverse Fourier transformed signals; and transmitting the first to hth inverse Fourier transformed signals via the first to hth transmission antennas.

According to an aspect of the present invention, there is provided with a program storage medium storing a program for inducing a computer which communicate with first to mth (m is an integer of 2 or more) communication apparatuses by using first to hth (h is an integer of m or more) transmission antennas, to execute instructions to perform the steps of:

generating first to mth signals to be transmitted to the first to mth communication apparatuses;

reading out allocation information from an allocation information storage, the allocation information defining that beams of different quality levels are allocated to the first to mth communication apparatuses for each of first to nth (n is an integer of 2 or more) subcarriers so that frequencies of respective quality levels are substantially uniform over all the first to nth subcarriers among the first to mth communication apparatuses;

determining transmission weights by which the first to mth signals are multiplied so that the beams of respective quality levels indicated in the allocation information are formed for the first to mth communication apparatuses for each of the first to nth subcarriers;

performing multiplication processing by using the first to mth signals and the transmission weights determined for each of the first to nth subcarriers to generate first to hth weighted signals for each of the first to nth subcarriers;

performing inverse Fourier transform on the first to hth weighted signals generated for each of the first to nth subcarriers to generate first to hth inverse Fourier transformed signals; and transmitting the first to hth inverse Fourier transformed signals via the first to hth transmission antennas.

BRIEF DESCRIPTION OF THE DRAWINGS

FIG. 2 shows a result of conducting a simulation of stream allocation using scheduling by Zhenyu Tu et al.;

FIG. 6 shows an example of stream allocation according to a second embodiment;

DETAILED DESCRIPTION OF THE INVENTION

First, the technical background against which the present inventor has come up with the idea of the present invention will be explained.

Figure 9:
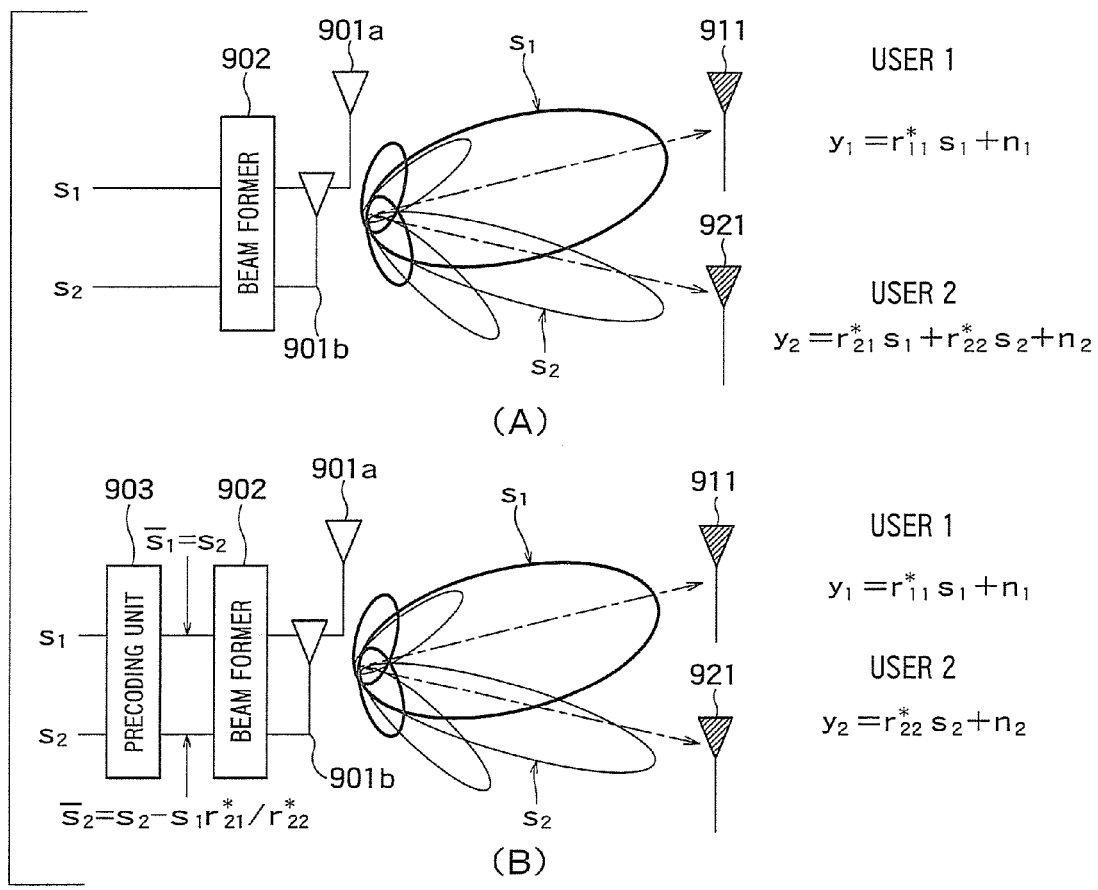
FIG. 9 illustrates a DPC-SDMA scheme.

In order to solve the above described problems of ZF-SDMA, Giuseppe Caire et al. propose a DPC (Dirty Paper Coding)-SDMA scheme in their book "On the Achievable Throughput of a Multiantenna. Gaussian Broadcast Channel." Hereinafter, this DPC-SDMA will be explained with reference to FIG. 9.

As shown in FIG. 9(A), suppose a base station (radio communication apparatus) is provided with two antennas 901a and 901b and a beam former 902, a user terminal (communication apparatus) 1 is provided with an antenna 911 and a user terminal (communication apparatus) 2 is provided with an antenna 921.

The DPC-SDMA scheme uses "Q" which is obtained by QR-decomposing "$H^H$", which is Hermitian transposition of a channel matrix "H" as weights. More specifically, "Q" calculated as $$H^H = QR \quad \text{[Formula 6]}$$

$$= \begin{bmatrix} q_{11} & q_{12} \\ q_{21} & q_{22} \end{bmatrix} \begin{bmatrix} r_{11} & r_{12} \\ 0 & r_{22} \end{bmatrix}$$

is used as a weight "W." Here, since "Q" is an orthogonal matrix, the above described ZF-SDMA produces no power increase which may be problematic.

When the beam former 902 multiplies transmission signals "s1" and "s2" to the user terminals 1 and 2 by the weight "W," received signals of the user terminal 1 and user terminal 2 are expressed as follows.

$$y = HWs + n \quad \text{[Formula 7]}$$

$$= R^H Q^H Q s + n$$

$$= R^H s + n$$

$$= \begin{bmatrix} r_{11}^* & 0 \\ r_{12}^* & r_{22}^* \end{bmatrix} \begin{bmatrix} s_1 \\ s_2 \end{bmatrix} + \begin{bmatrix} n_1 \\ n_2 \end{bmatrix}$$

Therefore, the user terminal 1 receives only the signal "s1" directed to the user terminal 1 and the user terminal 2 receives the signal "s1" directed to the user terminal 1 and the signal "s2" directed to the user terminal 2.

In this case, FIG. 9(A) shows images of beams created by the weight "W." The signal "s1" to the user terminal 1 is transmitted with such a beam that a maximum gain is obtained at the user terminal 1. This means that a beam of maximum ratio combination is transmitted, and therefore the diversity order becomes 2 and has a better characteristic than ZF-SDMA. However, since this beam does not take the user terminal 2 into consideration, the signal "s1" also arrives at the user terminal 2.

On the other hand, the signal "s2" to the user terminal 2 is transmitted with such a beam that does not arrive at the user terminal 1. As a result, the signal of the user terminal 2 does not arrive at the user terminal 2 at a maximum gain. Since the diversity order is 1, the characteristic of the user terminal 2 is the same as that of ZF-SDMA. Furthermore, as described above, the user terminal 2 receives interference from the user terminal 1.

Therefore, DPC-SDMA applies precoding to a transmission signal. FIG. 9(B), shows a configuration of the base station mounted with a precoding unit that performs precoding.

A precoding unit 903 performs precoding on the input signals "s1" and "s2" and thereby generates a precoding signal "s1" expressed by Formula (8).

$$s' = \begin{bmatrix} s_1 \\ s_2 - s_1 r_{12}^* / r_{22}^* \end{bmatrix} \quad \text{[Formula 8]}$$

When such precoding is applied, the final transmission signal becomes $$x' = Ws' \quad \text{[Formula 9]}$$

In this case, the signals received by the user terminals 1 and 2 can be described as follows.

$$\begin{aligned} y' &= Hx' + n \quad \text{[Formula 10]} \\ &= HWs' + n \\ &= R^H Q^H Q s' + n \\ &= R^H s' + n \\ &= \begin{bmatrix} r_{11}^* & 0 \\ r_{12}^* & r_{22}^* \end{bmatrix} \begin{bmatrix} s_1 \\ s_2 - s_1 r_{12}^* / r_{22}^* \end{bmatrix} + \begin{bmatrix} n_1 \\ n_2 \end{bmatrix} \\ &= \begin{bmatrix} r_{11}^* s_1 + n_1 \\ r_{22}^* s_2 + n_2 \end{bmatrix} \end{aligned}$$

Therefore, the user terminal 1 and user terminal 2 can communicate with each other without mutual interference.

Here, as is clear with reference to FIG. 9(B), in the case of the DPC-SDMA scheme, the user terminal 1 and user terminal 2 have reception characteristics which are considerably different from each other. For example, while the signal to the user terminal 1 is transmitted with such a beam that a maximum gain is directed, the signal to the user terminal 2 is intended to suppress interference with the user terminal 1 and does not result in a maximum gain. Therefore, the reception quality of the user terminal 1>reception quality of the user terminal 2 in this case.

However, since neither of the beams of the user terminal 1 and user terminal 2 achieves a maximum gain in the aforementioned ZF-SDMA, DPC-SDMA can be said to be a better scheme than ZF-SDMA.

On the other hand, if the number of user terminals is four, the DPC-SDMA scheme has a feature that the reception quality is highest at the user terminal 1 and the reception quality deteriorates in order of user terminal 2, user terminal 3, user terminal 4. Here, for convenience' sake, suppose the data transmitted with a beam to which a maximum gain is directed is called a "first stream" followed by "second stream," "third stream" and "fourth stream" in that order.

When the base station is provided with four antennas, a user terminal allocated to the first stream can obtain a characteristic equivalent to a case with diversity using four reception antennas. Therefore, a multivalue modulation scheme that allows high-speed transmission such as 256QAM and 128QAM can be allocated to this user terminal.

On the contrary, a user terminal allocated to the fourth stream can obtain only a characteristic equivalent to reception performance with one antenna, and therefore a modulation scheme of merely 16QAM or so can be allocated to this user terminal.

However, under a modulation scheme such as 256QAM or 128QAM, no matter how high SN ratio is obtained by means of diversity or the like, the reception characteristic generally deteriorates due to analog distortion such as power amplifier distortion or synthesizer distortion. Such analog distortion is particularly outstanding in the case of an inexpensive radio set. Therefore, even when a multivalue modulation scheme such as 256QAM or 128QAM is allocated to a user terminal having a stream of good characteristic, the reception characteristic deteriorates due to analog distortion, and therefore suitable communication capacity cannot be obtained when viewed from all user terminals (entire system).

Furthermore, stream allocation is fixed under a conventional DPC-SDMA scheme and a stream of good characteristic is fixed to a specific user terminal, and therefore a user terminal to which a stream of bad characteristic is allocated has a problem that even a minimum resource necessary to establish communication is not allocated.

Embodiments of the present invention are intended to solve the problems of such a conventional DPC-SDMA scheme, increase the communication capacity of all user terminals and allow each user terminal to secure minimum communication resources.

Hereinafter, embodiments will be explained in detail with reference to the accompanying drawings.

First Embodiment

Figure 1:
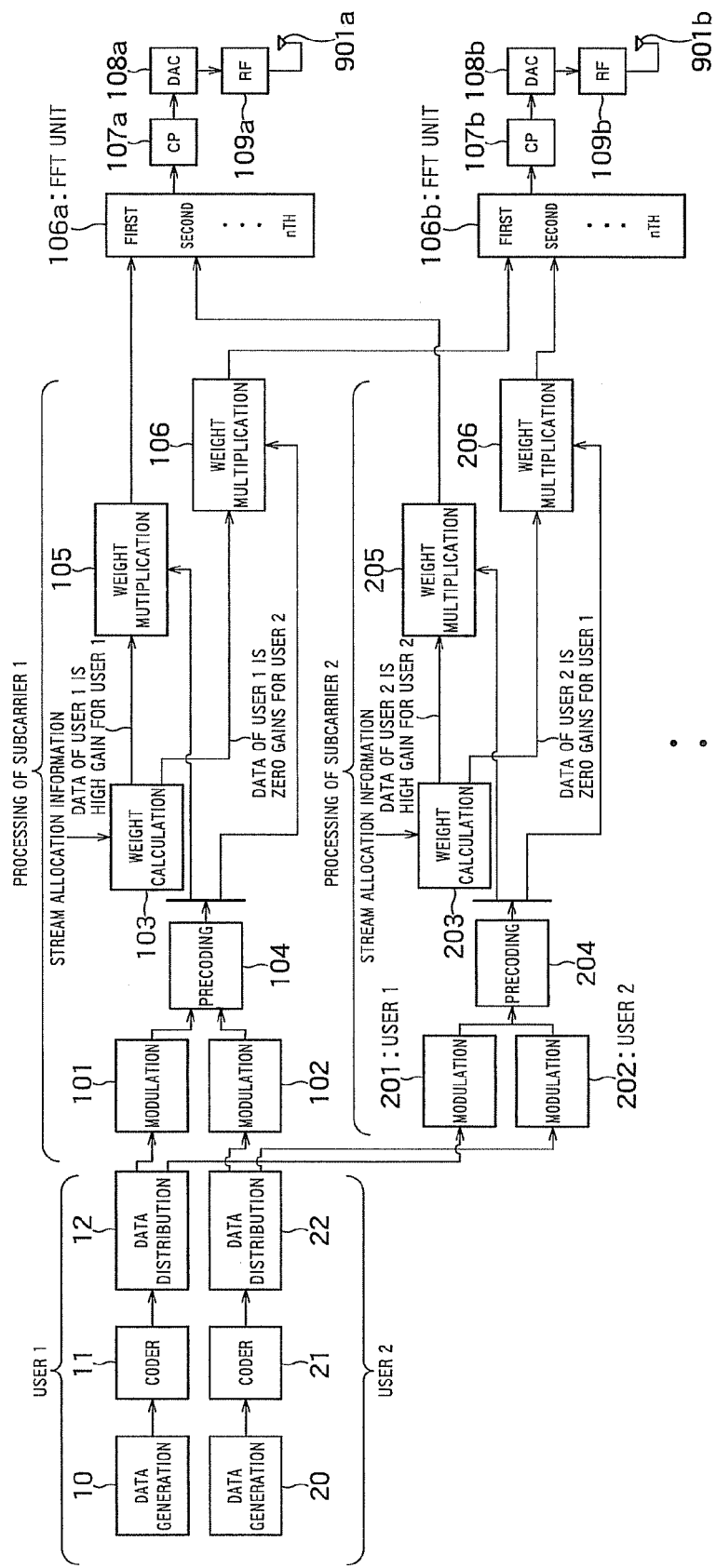
FIG. 1 is a block diagram showing a schematic configuration of a base station as a first embodiment of the present invention.

FIG. 1 is a block diagram showing a schematic configuration of a radio communication apparatus (base station) as a first embodiment of the present invention.

This base station performs transmission to a terminal of a user 1 (user terminal 1) and a terminal of a user 2 (user terminal 2) using a plurality of antennas based on an OFDM (Orthogonal Frequency Division Multiplexing) scheme. Suppose the OFDM scheme uses mutually orthogonal first to nth (n is an integer of 2 or more) subcarriers. The plurality of antennas correspond to, for example, first to hth (h is an integer of 2 or more and n or less) transmission antennas, and an example of h=2 is shown here. The user terminals 1 and 2 correspond to other party communication apparatuses with which the base station communicates. The other party communication apparatuses are first to mth (m is an integer of 2 or more and h or less) communication apparatuses, and an example of m=2 is shown here.

A data generation unit 10, an error correction coder 11 and a data distribution unit 12 are a block that performs processing on the user terminal 1, while a data generation unit 20, an error correction coder 21 and a data distribution unit 22 are a block that performs processing on the user terminal 2.

Furthermore, a modulation unit 101, a modulation unit 102, a weight calculation unit 103, a preceding unit 104, a weight multiplication unit 105 and a weight multiplication unit 106 are a block that performs processing on a first subcarrier, while a modulation unit 201, a modulation unit 202, a weight calculation unit 203, a precoding unit 204, a weight multiplication unit 205 and a weight multiplication unit 206 are a block that performs processing on a second subcarrier. Blocks that perform processing on third to nth subcarriers are omitted for simplicity of drawings.

The data generation unit 10, error correction coder 11, data distribution unit 12, modulation unit 101 and modulation unit 201 form, for example, a first signal generation unit, while the data generation unit 20, error correction coder 21, data distribution unit 22, modulation unit 102 and modulation unit 202 form a second signal generation unit. That is, the base station is provided with first to mth signal generation units, and an example of m=2 is shown here.

The weight calculation unit 103 and weight calculation unit 203 correspond to first and second weight determining units. The base station is provided with first to nth weight calculation units, but the third to nth weight calculation units are omitted for simplicity of drawings as described above.

The weight multiplication unit 105 and weight multiplication unit 106 form a first weighted signal generation unit and the weight multiplication unit 205 and weight multiplication unit 206 form a second weighted signal generation unit. That is, the base station is provided with first to nth weight generation units and the third to nth weight generation units are omitted for simplicity of drawings as described above.

The precoding unit 104 and precoding unit 204 correspond to first and second precoding units. That is, the base station is provided with first to nth precoding units and the third to nth precoding units are omitted for simplicity of drawings as described above.

An IFFT unit 106a, a cyclic prefix (CP) adding unit 107a, a DAC (Digital-Analog Converter) 108a and a radio processing unit 109a are a block that processes data outputted from an antenna 901a, while an IFFT unit 106b, a cyclic prefix adding unit 107b, a DAC 108b and a radio processing unit 109b are a block that processes data outputted from an antenna 901a.

The IFFT unit 106a and IFFT unit 106b correspond to first and second inverse Fourier transform units. That is, the base station is provided with first to hth inverse Fourier transform units and an example of h=2 is shown here. The cyclic prefix adding unit 107a, DAC 108a and radio processing unit 109a form, for example, a first transmission processing unit, while the cyclic prefix adding unit 107b, DAC 108b and radio processing unit 109b form a second transmission processing unit. The base station is provided with first to hth transmission processing units and an example of h=2 is shown here.

Hereinafter, details of the respective blocks will be explained.

The data generation unit 10 generates transmission data to the user terminal 1. The error correction coder 11 applies error correction coding to the transmission data to the user terminal 1 generated by the data generation unit 10. The data distribution unit 12 distributes the data subjected to error correction coding to the modulation unit 101 and 201 . . . for the respective subcarriers. That is, the error correction coded data of the user terminal 1 is distributed to the modulation unit 101 for the subcarrier 1, modulation unit 201 for the subcarrier 2 . . . modulation unit (not shown) for the subcarrier n.

For the user terminal 2, the data generation unit 20 likewise generates transmission data to the user terminal 2. The error correction coder 21 applies error correction coding to the transmission data to the user terminal 2 generated by the data generation unit 20. The data distribution unit 22 distributes the error correction coded data to the modulation units 102, 202, . . . for the respective subcarriers. That is, the error correction coded data of the user terminal 2 is sent to the modulation unit 102 for the subcarrier 1, modulation unit 202 for the subcarrier 2, . . . modulation unit (not shown) for the subcarrier n.

The modulation units 101, 102 perform modulation such as QPSK, 16QAM or 64QAM and transmission signals of the user terminals 1 and 2 for the subcarrier 1 are thereby generated (see Formula (1)). Suppose the transmission signal to the user terminal 1 is "s1" and the transmission signal to the user terminal 2 is "s2."

The transmission signal "s1" or output signal of the data generation unit 10 or output signal of the error correction coder 11 or output signal of the data distribution unit 12 or output signal of the data modulation unit 201 which will be described later corresponds to, for example, a first signal. On the other hand, the transmission signal "s2" or output signal of the data generation unit 20 or output signal of the error correction coder 21 or output signal of the data distribution unit 22 or output signal of the data modulation unit 202 which will be described later corresponds to, for example, a second signal.

The weight calculation unit 103 performs QR decomposition on the subcarrier 1 using a channel response acquired beforehand according to stream (beam) allocation predetermined for each user terminal (see Formula (6)). Stream allocation information for each subcarrier and for each user terminal is stored beforehand in a storage (allocation information storage) such as RAM, ROM, hard disk (not shown) or the like and the weight calculation unit 103 acquires stream allocation for the subcarrier 1 with reference to this storage. The weight calculation unit 103 informs a "Q" obtained by QR decomposition to the weight multiplication units 105 and 106. The weight multiplication units 105 and 106 use the "Q" received from the weight calculation unit 103 as a weight matrix "W" (transmission weights) (weight matrix "W"="Q"). Furthermore, the weight calculation unit 103 informs an "$R^H$" to the precoding unit 104 and the precoding unit 104 uses the "$R^H$" informed from the weight calculation unit 103 as a coefficient of precoding. Here, the weight calculation unit 103 obtains the "Q" (weight matrix "W") through calculations, but the weight calculation unit 103 may also prepare a table that associates a channel response and stream allocation with "Q" (weight matrix "W") and acquire "Q" (weight matrix "W") with reference to this table based on the acquired channel response and stream allocation.

The precoding unit 104 performs precoding on the transmission signal "s1" of the user terminal 1 received from the modulation unit 101 and the transmission signal "s2" of the user terminal 2 received from the modulation unit 102 using the "$R^H$" informed from the weight calculation unit 103 (see Formula (8)).

The weight multiplication unit 105 multiplies the first row of the weight matrix "W" by the preceded signal (see Formula (8)) (first element in Formula (9) is calculated). Furthermore, the weight multiplication unit 106 multiplies the second row of the weight matrix "W" by the preceded signal (see Formula (8)) (second element in Formula (9) is calculated).

The signal obtained by the weight multiplication unit 105 (first element in Formula (9)) is outputted to a port corresponding to the subcarrier 1 of the IFFT unit 106a and the signal obtained by the weight multiplication unit 106 (second element in Formula (9)) is outputted to a port corresponding to the subcarrier 1 of the IFFT unit 106b.

The signal obtained by the weight multiplication unit 105 (first element in Formula (9)) corresponds, for example, to the first weighted signal and the signal obtained by the weight multiplication unit 106 (second element in Formula (9)) corresponds, for example, to the second weighted signal. As described above, the weight multiplication unit 105 and weight multiplication unit 106 form the first weighted signal generation unit and the first weighted signal generation unit generates first and second weighted signals (h=2 in this embodiment).

As for processing on the subcarrier 2, only stream allocation of each user terminal and the method of calculating weights based on this stream allocation are different and other aspects are similar to the processing on the subcarrier 1.

That is, the modulation units 201 and 202 perform modulation such as QPSK, 16QAM or 64QAM and transmission signals of the user terminals 1 and 2 for the subcarrier 2 are generated (see Formula (1)). Suppose the transmission signal to the user terminal 1 is "s1" and the transmission signal to the user terminal 2 is "s2."

The weight calculation unit 203 performs QR decomposition on the subcarrier 2 according to stream allocation predetermined for each user terminal using a channel response acquired beforehand (see Formula (6)). Stream allocation information for each subcarrier and for each user terminal is stored beforehand in a storage (allocation information storage) such as ROM (not shown) and the weight calculation unit 203 acquires stream allocation for the subcarrier 2 with reference to this storage. The weight calculation unit 203 informs a "Q" acquired through QR decomposition to the weight multiplication units 205 and 206. The weight multiplication units 205 and 206 use the "Q" received from the weight calculation unit 203 as a weight matrix "W" (transmission weights) (weight matrix "W"="Q"). Furthermore, the weight calculation unit 203 informs an "$R^H$" to the precoding unit 204 and the precoding unit 204 uses the "$R^H$" informed from the weight calculation unit 203 as a precoding coefficient. Here, the weight calculation unit 203 obtains the "Q" (weight matrix "W") through calculations, but the weight calculation unit 203 may also prepare a table that associates a channel response and stream allocation with a "Q" (weight matrix "W") and acquire the "Q" (weight matrix "W") with reference to this table based on the acquired channel response and stream allocation.

The precoding unit 204 performs precoding on the transmission signal "s1" of the user terminal 1 received from the modulation unit 201 and the transmission signal "s2" of the user terminal 2 received from the modulation unit 202 using the "$R^H$" informed from the weight calculation unit 203 (see Formula (8)).

The weight multiplication unit 205 multiplies the first row of the weight matrix "W" by the preceded signal (see Formula (8)) (first element in Formula (9) is calculated). Furthermore, the weight multiplication unit 206 multiplies the second row of the weight matrix "W" by the preceded signal (see Formula (8)) (second element in Formula (9) is calculated).

The signal obtained by the weight multiplication unit 205 (first element in Formula (9)) is outputted to a port corresponding to the subcarrier 2 of the IFFT unit 106a and the signal obtained by the weight multiplication unit 206 (second element in Formula (9)) is outputted to a port corresponding to the subcarrier 2 of the IFFT unit 106b.

The signal obtained by the weight multiplication unit 205 (first element in Formula (9)) corresponds, for example, to the first weighted signal and the signal obtained by the weight multiplication unit 206 (second element in Formula (9)) corresponds, for example, to the second weighted signal. As described above, the weight multiplication unit 205 and weight multiplication unit 206 form the second weighted signal generation unit and the second weighted signal generation unit generates first and second weighted signals (h=2 in this embodiment).

Here, the stream allocation information used in the weight calculation units 103 and 203 will be explained.

As described above, the stream allocation information is information that defines a stream to which each user terminal is allocated for each subcarrier. For example, with respect to the subcarrier 1, the stream allocation information defines that the user terminal 1 is allocated to the "first stream" and the user terminal 2 is allocated to the "second stream." The scheme of searching allocation of the user terminals is also called "scheduling" and the scheduling method that maximizes the system capacity in a DPC-SDMA system is described in the document by Zhenyu Tu et al. "Multiuser Diversity for a Dirty Paper Approach."

FIG. 2 shows the result of performing a simulation of stream allocation using the scheduling by Zhenyu Tu et al. when a DPC-SDMA scheme is applied to OFDM communication.

The wireless system used in the simulation is wireless LAN standard IEEE802.11n and "B" and "D" of a TGn channel model, which is a channel model of the relevant standard is used as the channel. FIG. 2(A) shows the simulation result of 1 channel model "B" and FIG. 2(B) shows the simulation result of 2 channel model "D." The horizontal axis shows subcarrier numbers and shows first to sixteenth subcarriers. Since four antennas are used here, four streams (first to fourth streams) exist. Numbers within the rectangles denote identifiers (numbers) of user terminals.

In the 1 channel model "B" in FIG. 2(A), the same stream is allocated to the respective user terminals on all subcarriers 1 to 16. The stream 1 of the best characteristic is allocated to the user terminal 3, and stream are allocated to the user terminals 4, 1 and 2 with characteristic descending in that order. The stream 1 corresponds to a beam of the highest quality level and the level of beam quality decreases in order of streams 2, 3, 4.

On the other hand, in the 2 channel model "D" in FIG. 2(B), stream allocation varies depending on subcarriers. For example, in the first to eighth subcarriers, the user terminal 1 uses the stream 1 of the best characteristic, and the user terminal 4, user terminal 2 and user terminal 3 use streams of characteristic descending in that order. Furthermore, as for the ninth to fifteenth subcarriers, the user terminal 4 uses the stream 1 of the best characteristic and the user terminal 1, user terminal 3, user terminal 2 use streams of characteristic descending in that order.

In this way, stream allocation does not vary in the 1 channel model "B," while stream allocation in the 2 channel model "D" varies depending on subcarriers because the spread of a multipath delay is shorter in the 1 channel model "B" than the 2 channel model "D" and the correlation between subcarriers is thereby lower. When the correlation between subcarriers is low, in the case of the algorithm of Zhenyu Tu et al., the probability that user terminals may use the same stream on neighboring subcarriers increases.

Here, in FIG. 2(A), for example, the user terminal 3 can use the stream 1 of good characteristic over all subcarriers, and therefore it is theoretically possible to use a multivalue modulation scheme such as 256QAM or 128QAM. On the other hand, the user terminal 2 or the like uses the stream 4 of bad characteristic, and therefore it is optimal to use a modulation scheme such as QPSK or 16QAM in improving throughput for the entire user terminal. However, as described above, when a modulation scheme such as 128QAM or 256QAM is used, the reception characteristic drastically deteriorates due to analog distortion or the like, there is a problem that a large communication capacity cannot be obtained when viewed from all the user terminals.

Figure 3:
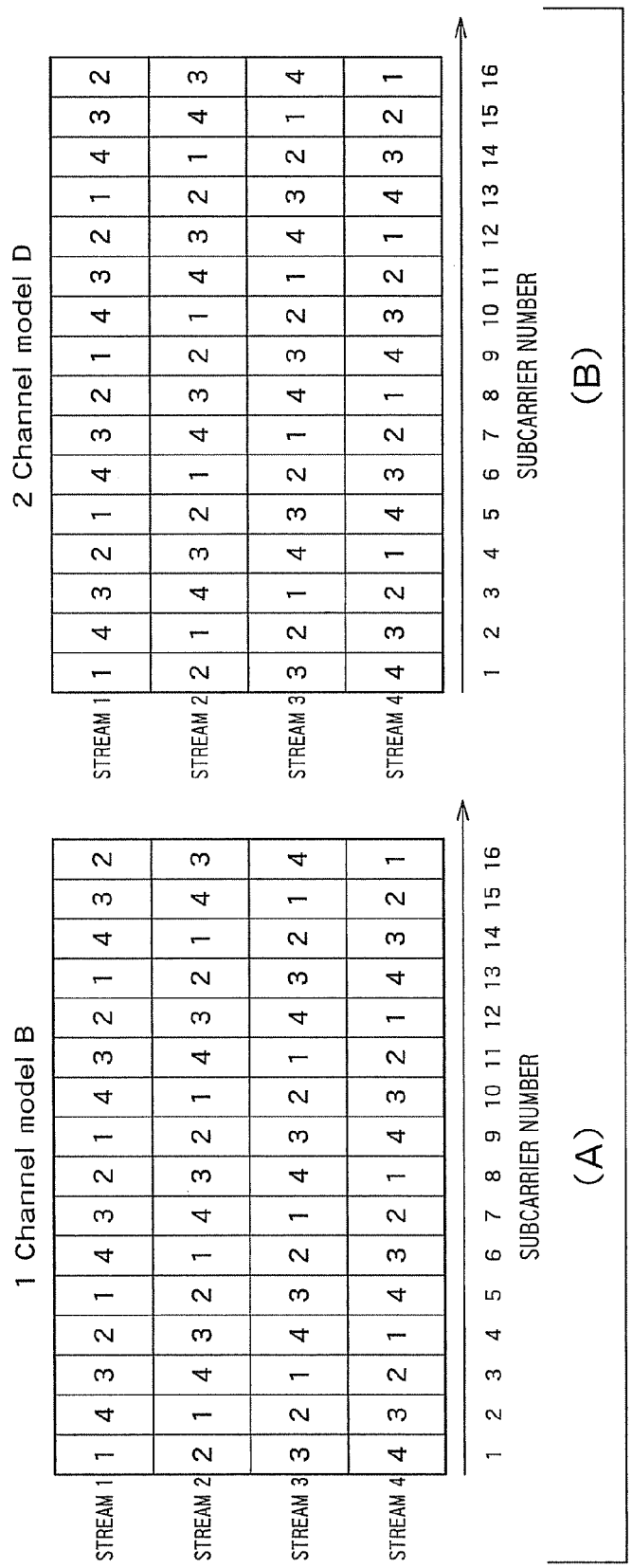
FIG. 3 shows an example of stream allocation according to the first embodiment.

Therefore, this embodiment performs stream allocation (beam allocation) in such a way that the streams 1 to 4 are allocated to the respective user terminals substantially uniformly. FIG. 3 shows an example of stream allocation according to this embodiment.

FIG. 3(A) shows an example of stream allocation in the case of 1 channel model "B" and FIG. 3(B) shows an example of stream allocation in the case of 2 channel model "D." Both the 1 channel model "B" and 2 channel model "D" have the same allocation contents. Such allocation information (stream allocation information) is predetermined as described above and stored in a storage such as a ROM (not shown).

As shown in FIG. 3(A) and FIG. 3(B), user terminals (1, 2, 3, 4) are allocated to streams (1, 2, 3, 4) on a subcarrier 1 and user terminals (4, 1, 2, 3) are allocated to streams (1, 2, 3, 4) on a subcarrier 2. Furthermore, user terminals (3, 4, 1, 2) are allocated to streams (1, 2, 3, 4) on a subcarrier 3 and user terminals (2, 3, 4, 1) are allocated to streams (1, 2, 3, 4) on a subcarrier 4.

In this way, stream allocation is performed on all subcarriers in such a way that the streams 1 to 4 are distributed to the respective user terminals substantially uniformly (the same number (or same frequencies) in this embodiment). That is, streams (beams) of different quality levels are allocated to the first to mth user terminals (communication apparatuses) for each of the first to nth subcarriers so that frequencies of different levels are uniform substantially on all the first to nth subcarriers among the first to mth communication apparatuses. As a result, any user terminal may use the stream 1 of good characteristic or use other streams and all the user terminals use the streams 1 to 4 substantially uniformly. In the example of FIG. 3, the first to fourth streams are allocated so as to circulate iteratively in the subcarrier direction for each user terminal.

In this embodiment, the number of subcarriers is 16 and the number of streams is 4, that is, the number of subcarriers is a multiple of the number of streams, and therefore streams are allocated to the respective user terminals uniformly. That is, four streams 1 are allocated to the user terminal 1 and the same applies to the user terminals 2, 3, 4, too. If the number of subcarriers is 17, suppose, for example, the number of streams 1 allocated to the user terminal 1 is 5 and the number of streams 1 allocated to the user terminals 2 to 4 is 4. In this way, when the number of subcarriers is not a multiple of the number of streams, stream allocation is performed in such a way that the difference in the number of respective streams becomes a maximum of 1 among user terminals. "Substantially uniform allocation" in this embodiment includes both a case where the same number of streams are allocated to each user terminal and a case where streams are allocated so that the difference in the number of streams becomes a maximum of 1.

Here, according to this embodiment, the error correction coders 11 and 21 perform error correction encoding and a signal subjected to error correction encoding (codeword) is distributed to the respective subcarriers. Therefore, when the receiving side (not shown) performs error correction decoding, data allocated to a subcarrier of low quality and containing an error can be rescued by the effect of data allocated to a subcarrier of good quality and without errors. Generally, when an OFDM scheme is used, coded-OFDM that applies error correction in a subcarrier direction is often used and suppose this coded-OFDM is also used in this embodiment. Therefore, when attention is focused, for example, on the user terminal 4, the user terminal 4 uses a stream of bad characteristic on the subcarrier 1, and so the quality of the subcarrier deteriorates, but since the user terminal 4 uses the stream 1 of better performance on the subcarrier 2, the data of the subcarrier 1 can be rescued by the data of the subcarrier 2.

In this way, since the streams 1 to 4 are uniformly allocated to the respective user terminals, when all subcarriers are considered, each user terminal can obtain the characteristic of accurately receiving a relatively multilevel modulation scheme such as 64QAM. Since this can be considered as a diversity effect in the subcarrier direction, suppose this effect is called a "diversity effect of DPC-SDMA." This diversity effect of DPC-SDMA operates on all user terminals to the same extent.

That is, in the case of the scheduling scheme by Zhenyu Tu et al., explained in FIG. 2(A) and FIG. 2(B), for example, 256QAM, 128QAM, 64QAM, 16QAM are allocated to user terminals in descending order of characteristic, but there is a low possibility that 256QAM or 128QAM may be received correctly due to the problem of analog distortion as described above. On the contrary, since based on the proposed scheme, for example, 64QAM is allocated to all user terminals and all user terminals can receive 64QAM accurately, it is possible to improve the transmission rate compared to the scheduling scheme in FIG. 2 when viewed as the entire system.

Here, in FIG. 2(B) when attention is focused, for example, on the user terminal 3, the stream 4 of the worst characteristic is used on the subcarriers 1 to 8, the stream 3 of the next worst characteristic is used on the subcarriers 9 to 15 and the stream 1 of the best characteristic is used on the subcarrier 16. Therefore, even when the scheduling scheme by Zhenyu Tu et al. explained in FIG. 2 is used, a certain degree of diversity effect may be obtained. However, in FIG. 2(B), streams 1 to 4 are not uniformly allocated to all user terminals and there still remains a variation in stream quality from one user terminal to another. Furthermore, according to the scheduling scheme of Zhenyu Tu et al., stream quality may drastically deviate from one user terminal to another as shown in FIG. 2(A), and since further complicated scheduling is performed, a large amount of calculation is required. On the contrary, since the proposed scheme only performs stream allocation to each user terminal according to a predetermined pattern, it is possible to obtain a great diversity effect with a much smaller amount of calculation compared to the scheduling scheme by Zhenyu Tu et al.

As described above, since the proposed scheme has the effect of making reception characteristics of all user terminals identical or substantially identical, it is preferable to regard user terminals located at distances identical to some extent from the base station as communication targets based on an SDMA scheme.

Returning to FIG. 1, an example of weight calculation carried out by weight calculation unit 103 and weight calculation unit 203 will be explained. Here, a case will be explained where the number of user terminals is 2, the user terminal 1 uses the stream 1 and the user terminal 2 uses the stream 2 on the subcarrier 1, whereas the user terminal 1 uses the stream 2 and user terminal 2 uses the stream 1 on the subcarrier 2.

The weight calculation unit 103 calculates weights when the user terminal 1 uses the stream 1 and the user terminal 2 uses the stream 2. More specifically, the channel matrix is decomposed as shown in Formula (11), $$H^H = Q^{(1)}R^{(1)} \qquad \text{[Formula 11]}$$
$$= \begin{bmatrix} q_{11}^{(1)} & q_{12}^{(1)} \\ q_{21}^{(1)} & q_{22}^{(1)} \end{bmatrix} \begin{bmatrix} r_{11}^{(1)} & r_{12}^{(1)} \\ 0 & r_{22}^{(1)} \end{bmatrix}$$

and "$Q^{(1)}$" is used as the weight "$W^{(1)}$" for the subcarrier 1. When this weight "$W^{(1)}$" is used, the received signal is expressed as $$y = HW^{(1)}s + n \quad \text{[Formula 12]}$$

$$= \begin{bmatrix} r_{11}^{(1)*} & 0 \\ r_{12}^{(1)*} & r_{22}^{(1)*} \end{bmatrix} \begin{bmatrix} s_1 \\ s_2 \end{bmatrix} + \begin{bmatrix} n_1 \\ n_2 \end{bmatrix}$$

However, this is the received signal when the precoding unit 104 does not perform precoding.

In this case, the user terminal 1 can receive the signal at a maximum gain "$r_{11}^{(1)*}$" and receives no interference from the user terminal 2. On the contrary, to avoid interference with the user terminal 1, the user terminal 2 cannot receive a signal directed to the own terminal at a maximum gain and includes interference from the user terminal 1.

Therefore, the precoding unit 104 performs precoding as follows.

$$s = \begin{bmatrix} s_1 \\ s_2 - s_1 r_{12}^{(1)*} / r_{22}^{(1)*} \end{bmatrix} \quad \text{[Formula 13]}$$

This allows both the user terminals 1 and 2 to receive signals directed to the own terminals without receiving interference.

In this way, the weight calculation unit 103 calculates transmission weights by which signals of the user terminals 1 and 2 (first and second signals) are multiplied so that the streams (beams) of the quality indicated in the stream allocation information with respect to the subcarrier 1 are formed in the user terminals 1 and 2. The precoding unit 104 performs precoding on the signals (first and second signals) of the user terminals 1 and 2 with respect to the subcarrier 1 so that user terminals to which streams (beams) of higher quality are allocated receive lower interference components from other user terminals.

On the other hand, the weight calculation unit 203 calculates weights when the user terminal 1 uses the stream 2 and the user terminal 2 uses the stream 1. More specifically, the weight calculation unit 203 decomposes the channel matrix as shown in Formula (14).

$$H^H = Q^{(2)} R^{(2)} \quad \text{[Formula 14]}$$

$$= \begin{bmatrix} q_{11}^{(2)} & q_{12}^{(2)} \\ q_{21}^{(2)} & q_{22}^{(2)} \end{bmatrix} \begin{bmatrix} r_{11}^{(2)} & 0 \\ r_{21}^{(2)} & r_{22}^{(2)} \end{bmatrix}$$

and uses "$Q^{(2)}$" as a weight "$W^{(2)}$" on the subcarrier 2. When this weight "$W^{(2)}$" is used, the received signal is expressed as $$y = HW^{(2)}s + n \quad \text{[Formula 15]}$$

$$= \begin{bmatrix} r_{11}^{(2)*} & r_{21}^{(2)*} \\ 0 & r_{22}^{(2)*} \end{bmatrix} \begin{bmatrix} s_1 \\ s_2 \end{bmatrix} + \begin{bmatrix} n_1 \\ n_2 \end{bmatrix}$$

However, this is a received signal when the precoding unit 104 does not perform precoding.

As is clear from Formula 15, the characteristic opposite to that of the subcarrier 1 is obtained and the user terminal 2 can receive a signal at a maximum gain "$r_{22}^{(2)*}$" and receives no interference from the user terminal 1. On the contrary, the user terminal 1 cannot receive a signal directed to the own terminal at a maximum gain to avoid interference with the user terminal 2 and includes interference from the user terminal 2.

Therefore, the precoding unit 204 performs precoding as follows.

$$s = \begin{bmatrix} s_1 - s_2 r_{21}^{(2)*} / r_{11}^{(2)*} \\ s_2 \end{bmatrix} \quad \text{[Formula 16]}$$

This allows both the user terminals 1 and 2 to receive signals directed to the own terminals without receiving interference.

In this way, the weight calculation unit 203 calculates transmission weights by which the signals of the user terminals 1 and 2 (first and second signals) are multiplied so that streams (beams) of quality indicated in stream allocation information with respect to the subcarrier 2 are formed in the user terminals 1 and 2. The precoding unit 204 performs precoding on the signals of the user terminals 1 and 2 (first and second signals) with respect to the subcarrier 2 so that user terminals to which streams (beams) of higher quality are allocated receive lower interference components from other user terminals.

The first component (first weighted signal) of a transmission signal "$W^{(1)}s$" for the subcarrier 1 generated by the weight multiplication unit 105 is outputted to the port corresponding to the subcarrier 1 of the IFFT unit 106a. Furthermore, the second component (second weighted signal) of a transmission signal "$W^{(1)}s$" for the subcarrier 1 generated by the weight multiplication unit 106 is outputted to the port corresponding to the subcarrier 1 of the IFFT unit 106b.

Likewise, the first component (first weighted signal) of a transmission signal "$W^{(2)}s$" for the subcarrier 2 generated by the weight multiplication unit 205 is outputted to the port corresponding to the subcarrier 2 of the IFFT unit 106a. Furthermore, the second component (second weighted signal) of a transmission signal "$W^{(2)}s$" for the subcarrier 2 generated by the weight multiplication unit 206 is outputted to the port corresponding to the subcarrier 2 of the IFFT unit 106b.

The IFFT unit 106a and IFFT unit 106b perform Inverse Fast Fourier Transform (IFFT) on the transmission signals inputted to the ports corresponding to the subcarriers 1, 2, . . . n, generate an Inverse Fast Fourier Transform signal (IFFT signal) and output the IFFT signal generated to cyclic prefix adding units 107a and 107b. As described above, the IFFT unit 106a and IFFT unit 106b correspond to the first and second inverse Fourier transform units and generate the first and second inverse Fourier transformed signals (h=2 in this embodiment).

The cyclic prefix adding units 107a and 107b add cyclic prefixes to the inverse Fast Fourier transformed signals and output the signals with the cyclic prefix added to the DACs 108a and 108b.

The DACs 108a and 108b convert the signals inputted from the cyclic prefix adding units 107a and 107b from digital signals to analog signals.

The radio processing units 109a and 109b perform conversion from baseband to radio frequency on the analog signals inputted from the DACs 108a and 108b, further perform radio processing such as amplification processing and thereby generate radio signals. The radio processing units 109a and 109b emit the radio signals generated into space as radio waves via the antennas 901a and 901b.

Here, the method of determining the modulation scheme and coding rate (MCS: Modulation and Coding Set) according to this embodiment will be explained.

Figure 4:
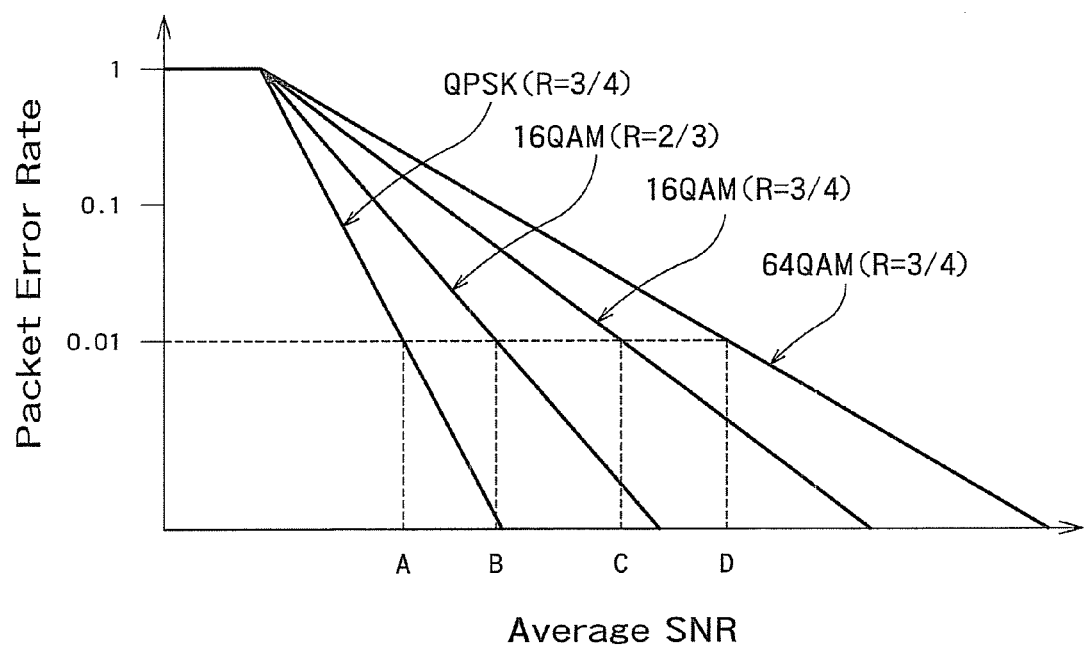
FIG. 4 shows table information showing a relationship between a received SNR, PER and MCS.

FIG. 4 shows table information showing a relationship between a received Signal to Noise Ratio (SNR), Packet Error Rate (PER) and MCS according to this embodiment.

The base station creates this table information beforehand and provides the table information for a storage such as ROM and RAM (not shown).

Here, if the radio system is a TDD (Time Division Duplex) scheme, channel responses of channels sent from the base station to an antenna 911 of the user terminal 1 and an antenna 921 of the user terminal 2 (see FIG. 9) are the same as channel responses of channels sent by the user terminals 1 and 2 from the antennas 911 and 921 to the base station. Therefore, the base station can estimate received SNRs of the antennas 911 and 921 from the SNRs of the data transmitted from the antennas 911 and 921 of the user terminals 1 and 2.

The base station determines an MCS when transmitting signals to the antennas 911 and 921 from the received SNRs and the table information in FIG. 4. The MCS is determined, for example, based on a standard of satisfying a PER of 1%.

For example, if the received SNR of the antenna 911 ranges from B to C in FIG. 4, 16QAM is used as the modulation scheme and ⅔ is used as an error correction coding rate "R." On the other hand, when the received SNR ranges from C to D, 16QAM is used as the modulation scheme and ¾ is used as the coding rate "R."

A mean value among subcarriers may be used as the received SNR or channel capacity versus PER may be used instead of the received SNR.

It has been described above that each user terminal is preferably located at an equal distance from the base station to some extent, but the present invention is also effective even if the distance from each user terminal to the base station varies from each other and an MCS for each user terminal can be allocated appropriately in this case, too. If, for example, the antenna 911 of the user terminal 1 is assumed to be closer to the base station than the antenna 921 of the user terminal 2, the received SNR of the antenna 911 of the user terminal 1 may range from B to C and the received SNR of the antenna 921 of the user terminal 2 may range from A to B. In this case, the base station selects an MCS that satisfies PER=1% for each user terminal, and any user terminal can thereby perform transmission of high quality.

This embodiment uses Zero-Forcing weights that totally null interference as shown in Formula (11), but it is also possible to apply a DPC-SDMA using MMSE (Minimum Mean-Square Error) that does not null interference equivalent to or less than thermal noise as described in the document by J. Liu et al. "Improved Tomlinson-Harashima preceding for the downlink of multiple antenna multi-user systems."

As described above, according to this embodiment, by uniformly allocating a plurality of streams of different reception characteristics to the respective user terminals over all subcarriers, all user terminals can obtain preferred reception quality combined with the effect of error correction decoding. Therefore, compared to a conventional scheme that allocates more than necessary resources to specific user terminals and thereby wastes communication resources, this embodiment can improve the communication speed of all user terminals (entire system).

Furthermore, according to this embodiment, since more than necessary communication resources are never allocated to specific user terminals, the modulation scheme such as 128QAM or 256QAM is not used heavily. Therefore, it is possible to realize high quality communication even in a communication system in which there is a radio set having a certain degree of analog distortion.

Furthermore, this embodiment can avoid calculations of complicated scheduling and provide an inexpensive radio set.

Second Embodiment

This embodiment is intended to obtain a communication characteristic of higher quality by improving an interleaving method carried out along with error correction coding.

While the basic configuration of this embodiment is the same as that of the first embodiment (see FIG. 1), this embodiment adds an improvement to stream allocation information referred to by the weight calculation unit 103 and weight calculation unit 203 which takes into consideration the above described interleaving.

First, interleaving will be explained. Characteristics of many error correction codes generally drastically deteriorate when errors are found consecutively in a coding sequence. To avoid this problem, processing called "interleaving" is performed to convert consecutive errors to distributed errors. This interleaving is performed by the data distribution units 12 and 22 in this embodiment.

Figure 5:
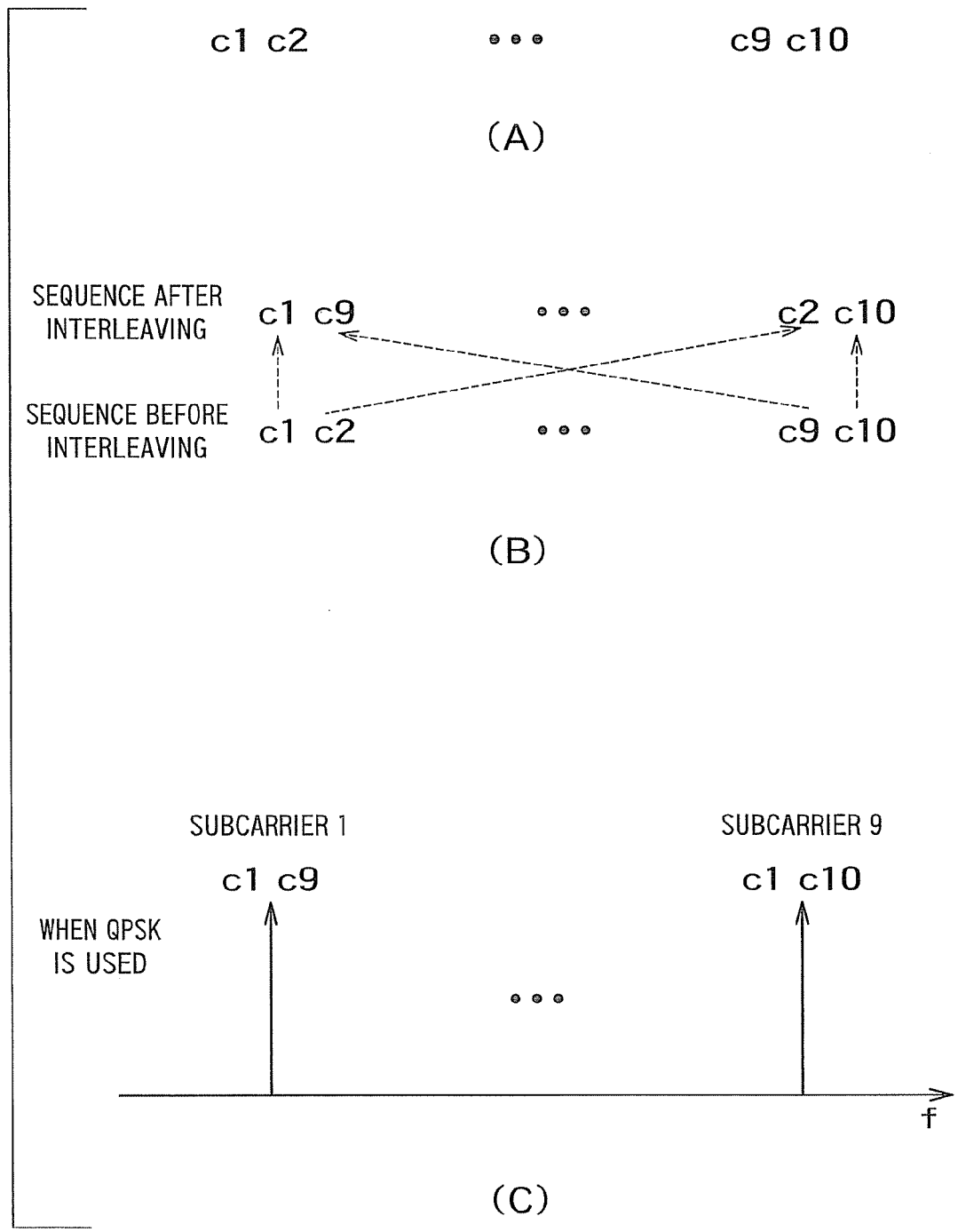
FIG. 5 shows a schematic diagram of interleaving used in OFDM communication.

FIG. 5 shows a schematic diagram of interleaving used in an OFDM communication.

As shown in FIG. 5(A), consider a bit sequence "$c1$" to "$c10$" after error correction coding. Suppose this is a bit sequence before interleaving. The bit sequence after error correction coding corresponds to a coded signal, for example. When QPSK modulation is assumed, since modulation is performed by considering two bits as one symbol, if no interleaving is applied, bits "$c1$" and "$c2$" make up one symbol of QPSK, which is allocated to a subcarrier 1 and transmitted. However, if the reception quality of the subcarrier 1 is low and errors occur in both the bits "$c1$" and "$c2$" consecutively, the receiving side cannot receive correct data even if an error correction is made.

Therefore, many OFDM communication schemes apply interleaving as shown in FIG. 5(B). This embodiment will explain interleaving whereby one of two mutually neighboring bits is mapped to a subcarrier located away at a distance of eight subcarriers. For example, in the case of bits "$c1$" and "$c2$," bit "$c1$" is mapped as is, while the mapping destination of bit "$c2$" is changed to subcarrier 9 as shown in FIG. 5(B), and FIG. 5(C) in particular. When the sequence after such interleaving is observed, bits which are located eight bits away from each other are mapped, for example, "$c1$" and "$c9$" on the subcarrier 1 and "$c2$" and "$c10$" on the subcarrier 9. Applying such interleaving prevents bits "$c1$" and "$c9$" from being contiguous bits even if reception quality of the subcarrier 1 is bad and errors occur in bits "$c1$" and "$c9$," and can thereby provide error correction with tolerance.

In the aforementioned stream allocation scheme in FIG. 3, use of such interleaving may cause inconvenience. For example, in FIG. 3(A), when attention is focused on the user terminal 4, the stream 4 of the worst characteristic is allocated thereto on the subcarrier 1 and the stream 4 of the worst characteristic is also allocated thereto on the subcarrier 9. Therefore, when bit "$c1$" is mapped to the subcarrier 1 and bit "$c2$" adjacent to bit "$c1$" is mapped to the subcarrier 9 through interleaving, there is a high possibility that bit errors may occur on the subcarriers 1 and 9, and therefore there is a high possibility that error correction decoding may not succeed on the receiving side.

Therefore, this embodiment performs stream allocation which is appropriate for when interleaving bits are used. FIG. 6 shows an example of stream allocation.

When attention is focused on the user terminal 4, the stream 4 of the worst characteristic is allocated thereto on the subcarrier 1, while the stream 1 of the best characteristic is allocated thereto on the subcarrier 9. Therefore, as in the case described above, even if bit "c1" is mapped to the subcarrier 1 and bit "c2" adjacent to bit "c1" is mapped to the subcarrier 9 through interleaving, there is a high possibility that the subcarrier 9 may obtain a correct bit and even if bit errors occur in the subcarrier 1, there is a high possibility that error correction decoding may succeed on the receiving side.

In this way, this embodiment interleaves a bit sequence (coded signal) after error correction coding so that two neighboring bits are allocated to subcarriers with streams of different quality levels. This can further increase the possibility of receiving data free of errors with the diversity effect of DPC-SDMA.

Third Embodiment

This embodiment has a feature of using a THP (Tomlinson-Harashima Precoding)-SDMA scheme as an SDMA scheme.

The basic configuration of this embodiment is the same as that of the first embodiment (see FIG. 1), but this embodiment is different from the first embodiment in the configuration of the preceding unit.

Figure 7:
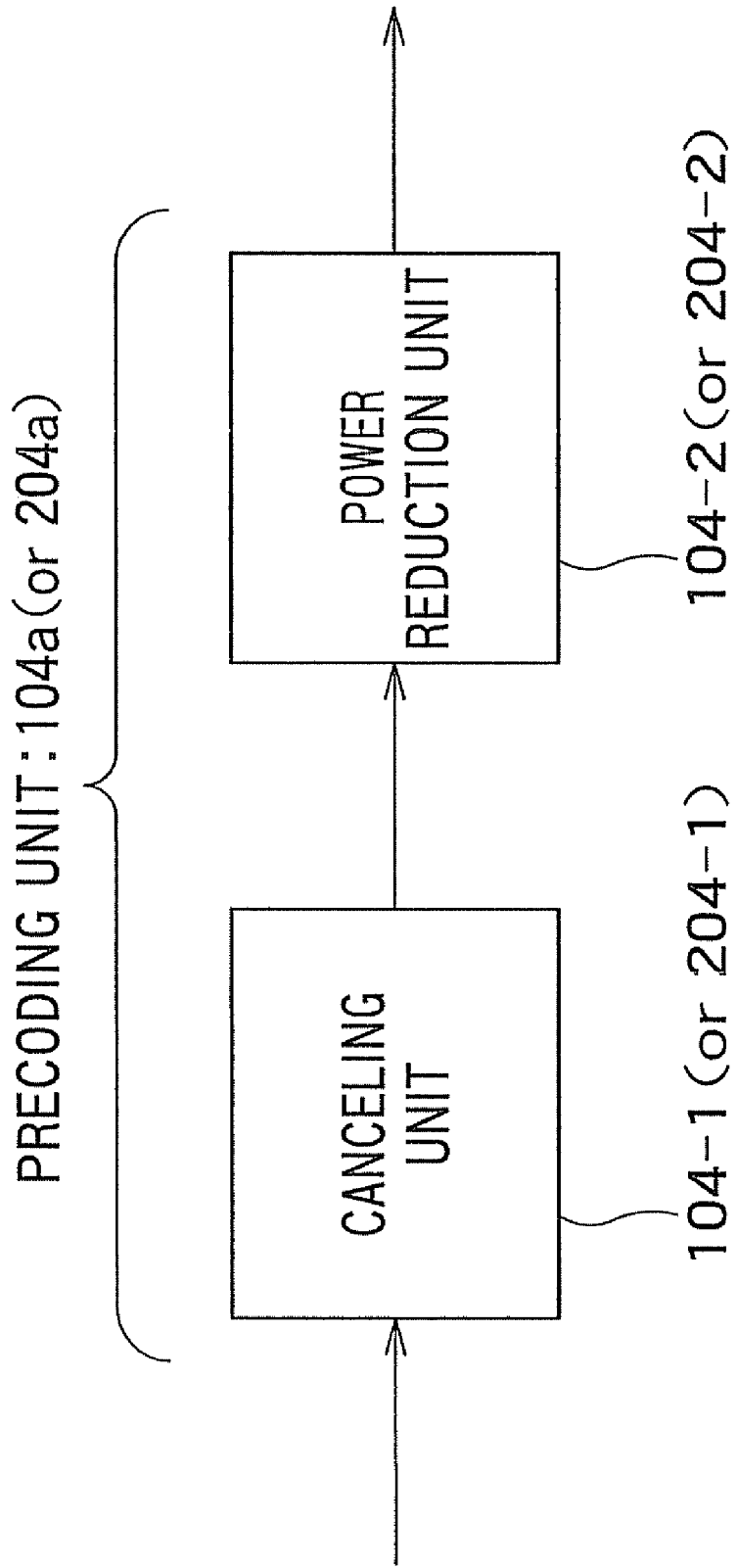
FIG. 7 shows a configuration example of a precoding unit according to a third embodiment.

FIG. 7 shows the configuration of a precoding unit 104a or 204a according to this embodiment. In this embodiment, the precoding units 104a and 204a are used instead of the precoding units 104 and 204 in FIG. 1.

This precoding unit 104a, 204a has a canceling unit, 104-1, 204-1 and a power reduction unit 104-2, 204-2. The canceling unit 104-1, 204-1 has the same function as that of the preceding unit 104, 204 in the first embodiment and is further provided with a power reduction unit 104-2, 204-2 having an additional function in this embodiment.

As described above, when the canceling unit 104-1, 204-1 (preceding unit 104a, 204a in FIG. 1) performs preceding, the transmission signal is expressed as $$s = \begin{bmatrix} s_1 \\ s_2 - s_1 r_{12}^{(1)*}/r_{22}^{(1)*} \end{bmatrix} \quad \text{[Formula 13]}$$

Here, when the power of signal "s1" and signal "s2" is assumed to be 1, $$s_2 - s_1 r_{12}^{(1)*}/r_{22}^{(1)*}$$

may be greater than 1 and a problem of transmission power occurs in this case.

Therefore, C. Windpassinger et al. propose a transmission power reduction method using Tomlinson-Harashima Precoding (THP) in the document "Precoding in multiantenna and multiuser communications." This method carries out a modulo calculation on a transmission signal made up of a complex number to reduce transmission power.

Figure 8:
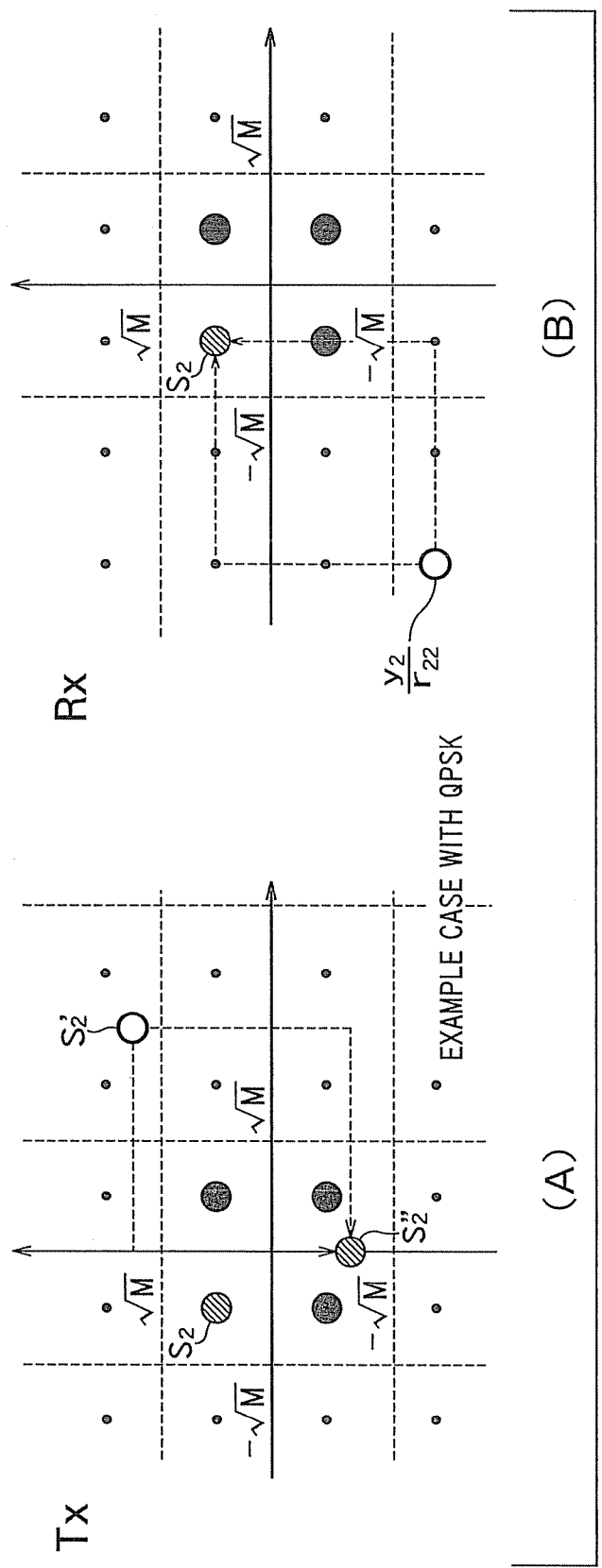
FIG. 8 illustrates a reduction of transmission power using THP.

Transmission power reduction using THP will be explained with reference to FIG. 8. In the following explanations, suppose "M" is the number of signals (modulation multivalue) and the amplitude of the signal "s1" and signal "s2" before precoding is $$\pm(\sqrt{M}-1).$$

For example, in the case of QPSK, M=4 and the amplitude of the signal "s1" and signal "s2" before precoding is $$\pm(\sqrt{M}-1)=\pm 1$$

As shown in FIG. 8(A), suppose an upper left point is the signal "s2" before precoding and this point is moved to an upper right black-outlined white point "s2'".

According to THP, an integer multiple of $$2\sqrt{M}$$

is subtracted from or added to a signal $$s_2 - s_1 r_{12}^{(1)*}/r_{22}^{(1)*}$$

after precoding (after canceling) on the real axis and the imaginary axis so that the amplitude becomes $$\sqrt{M}-1$$

or less. This is equivalent to a modulo calculation with $$2\sqrt{M}$$

being carried out on a signal after precoding (after canceling). The modulo calculation is a remainder resulting from dividing a first argument by a second argument, and in the above example, the first argument corresponds to the signal after precoding (after canceling) and the second argument corresponds to a value $$2\sqrt{M}$$

corresponding to the modulation multivalue.

Here, suppose $$2\sqrt{M}$$

is subtracted one time from $$s_2 - s_1 r_{12}^{(1)*}/r_{22}^{(1)*}$$

on the I phase and $$2\sqrt{M}$$

is subtracted one time on the Q phase. In this way, the signal point "s2'" is moved to $$s_2 - s_1 r_{12}^{(1)*}/r_{22}^{(1)*} - 2\sqrt{M} - j2\sqrt{M}(=s_2\text{''})$$

whose amplitude value is ±1 or less. That is, in FIG. 8(A), the black-outlined white point "s2'" is moved to a point whose amplitude is $$\sqrt{M}-1$$

or less. The base station carries out weight calculation and transmission using this value.

On the other hand, the receiving side receives a signal of $$r^*_{22}(s_2 - 2\sqrt{M} - j2\sqrt{M})$$

if the noise component is ignored. Therefore, when the gain of a channel is divided, the signal becomes $$s_2 - 2\sqrt{M} - j2\sqrt{M}.$$

This is shown as a black-outlined white point in FIG. 8(B). Since this signal exceeds the amplitude value $$\sqrt{M}-1$$

before precoding (before canceling), the receiving side (user terminal) can recover the original signal "s2" by adding $$2\sqrt{M}$$

one time on the I phase and the Q phase.

As described above, details of THP are described in the document by C. Windpassinger et al. "Precoding in multiantenna and multiuser communications."

In this way, according to this embodiment, it is possible to improve the speed of all user terminals or communication quality without increasing transmission power.

In the practical wireless system, the indicator that tells whether conventional stream allocation is used or stream allocation in this embodiment is used. The receiver can know the edge of the stream by reading the indicator and it is used to estimate a channel response in the subcarrier of interest. The channel estimate is used to decode the data in the subcarrier.

The base station (radio communication apparatus) of this embodiment may also be realized using a general-purpose computer device as basic hardware. That is, the data generation unit, error correction coder, data distributing unit, data modulating unit, preceding unit, weight calculation unit, weight multiplication unit, FFT unit, cyclic prefix adding unit, DAC, radio processing unit, canceling unit and power reducing unit can be realized by causing a processor mounted in the above described computer device to execute a program. In this case, the base station may be realized by installing the above described program in the computer device beforehand or may be realized by storing the program in a storage medium such as a CD-ROM or distributing the above described program over a network and installing this program in the computer device as appropriate. Furthermore, the allocation information storage may also be realized using a memory device or hard disk incorporated in or externally added to the above described computer device or a storage medium such as CD-R, CD-RW, DVD-RAM, DVD-R as appropriate.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. A radio communication apparatus that communicates with first to mth (m is an integer of 2 or more) communication apparatuses by using first to hth (h is an integer of m or more) transmission antennas, comprising:
   first to mth signal generation units configured to generate first to mth signals to be transmitted to the first to mth communication apparatuses;
   an allocation information storage configured to store allocation information defining that beams of different quality levels are allocated to the first to mth communication apparatuses for each of first to nth (n is an integer of 2 or more) subcarriers so that frequencies of respective quality levels are substantially uniform over all the first to nth subcarriers among the first to mth communication apparatuses;
   first to nth weight determining units configured to determine transmission weights by which the first to mth signals are multiplied so that the beams of respective quality levels indicated in the allocation information are formed for the first to mth communication apparatuses for each of the first to nth subcarriers;
   first to nth weighted signal generation units configured to perform multiplication processing by using the first to mth signals and the transmission weights determined for each of the first to nth subcarriers to generate first to hth weighted signals for each of the first to nth subcarriers;
   first to hth inverse Fourier transform units configured to perform inverse Fourier transform on the first to hth weighted signals generated for each of the first to nth subcarriers to generate first to hth inverse Fourier transformed signals; and
   first to hth transmission processing units configured to transmit the first to hth inverse Fourier transformed signals via the first to hth transmission antennas.

2. The apparatus according to claim 1, wherein the allocation information defines that a difference in frequencies of quality levels allocated to the first to mth communication apparatuses is set to 1 or less for each of the different quality levels.

3. The apparatus according to claim 1, wherein the allocation information defines that the quality levels allocated to each of the first to mth communication apparatuses circulate iteratively in a direction in which the subcarriers are arranged.

4. The apparatus according to claim 1, further comprising:
   first to mth error correction coders configured to perform error correction encoding on the first to mth signals; and
   first to mth interleaving units configured to interleave first to mth coded signals so that two neighboring bits are allocated to subcarriers differing in beam quality.

5. The apparatus according to claim 1, further comprising first to nth precoding units configured to perform precoding on the first to mth signals for each of the first to nth subcarriers so as to reduce signal interference among the communication apparatuses.

6. The apparatus according to claim 5, wherein the first to mth signal generation units modulate the first to mth signals using a certain modulation scheme, and
   the first to nth precoding units perform the precoding on the first to mth modulated signals, perform modulo calculations on the first to mth signals after the precoding with values corresponding to a modulation multivalue of the certain modulation scheme to suppress amplitude of the first to mth modulated signals.

7. A radio communication method that communicates with first to mth (m is an integer of 2 or more) communication apparatuses by using first to hth (h is an integer of m or more) transmission antennas, comprising:
   generating first to mth signals to be transmitted to the first to mth communication apparatuses;
   reading out allocation information from an allocation information storage, the allocation information defining that beams of different quality levels are allocated to the first to mth communication apparatuses for each of first to nth (n is an integer of 2 or more) subcarriers so that frequencies of respective quality levels are substantially uniform over all the first to nth subcarriers among the first to mth communication apparatuses;
   determining transmission weights by which the first to mth signals are multiplied so that the beams of respective quality levels indicated in the allocation information are formed for the first to mth communication apparatuses for each of the first to nth subcarriers;
   performing multiplication processing by using the first to mth signals and the transmission weights determined for each of the first to nth subcarriers to generate first to hth weighted signals for each of the first to nth subcarriers;
   performing inverse Fourier transform on the first to hth weighted signals generated for each of the first to nth subcarriers to generate first to hth inverse Fourier transformed signals; and
   transmitting the first to hth inverse Fourier transformed signals via the first to hth transmission antennas.

8. A program storage medium storing a program for inducing a computer which communicate with first to mth (m is an integer of 2 or more) communication apparatuses by using first to hth (h is an integer of m or more) transmission antennas, to execute instructions to perform the steps of:

generating first to mth signals to be transmitted to the first to mth communication apparatuses;

reading out allocation information from an allocation information storage, the allocation information defining that beams of different quality levels are allocated to the first to mth communication apparatuses for each of first to nth (n is an integer of 2 or more) subcarriers so that frequencies of respective quality levels are substantially uniform over all the first to nth subcarriers among the first to mth communication apparatuses;

determining transmission weights by which the first to mth signals are multiplied so that the beams of respective quality levels indicated in the allocation information are formed for the first to mth communication apparatuses for each of the first to nth subcarriers;

performing multiplication processing by using the first to mth signals and the transmission weights determined for each of the first to nth subcarriers to generate first to hth weighted signals for each of the first to nth subcarriers;

performing inverse Fourier transform on the first to hth weighted signals generated for each of the first to nth subcarriers to generate first to hth inverse Fourier transformed signals; and transmitting the first to hth inverse Fourier transformed signals via the first to hth transmission antennas.

* * * * *